United States Patent
Washizu et al.

(10) Patent No.: US 8,269,782 B2
(45) Date of Patent: Sep. 18, 2012

(54) GRAPHICS PROCESSING APPARATUS

(75) Inventors: Yoshinori Washizu, Tokyo (JP); Motoi Kaneko, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 803 days.

(21) Appl. No.: 11/927,837

(22) Filed: Oct. 30, 2007

(65) Prior Publication Data

US 2008/0278509 A1    Nov. 13, 2008

Related U.S. Application Data

(60) Provisional application No. 60/865,180, filed on Nov. 10, 2006.

(51) Int. Cl.
*G06F 15/80*    (2006.01)
(52) U.S. Cl. ........................................ 345/505
(58) Field of Classification Search .................. None
See application file for complete search history.

(56) References Cited

U.S. PATENT DOCUMENTS

| | | | |
|---|---|---|---|
| 5,329,615 A * | 7/1994 | Peaslee et al. | 345/502 |
| 6,326,964 B1 * | 12/2001 | Snyder et al. | 345/419 |
| 6,862,027 B2 * | 3/2005 | Andrews et al. | 345/505 |
| 6,952,217 B1 * | 10/2005 | Diard et al. | 345/562 |
| 7,629,978 B1 * | 12/2009 | Diard | 345/502 |
| 2005/0057517 A1 * | 3/2005 | Rix | 345/168 |
| 2006/0114260 A1 * | 6/2006 | Diard | 345/505 |
| 2006/0161741 A1 * | 7/2006 | Yasue et al. | 711/152 |
| 2007/0088959 A1 * | 4/2007 | Cox et al. | 713/189 |
| 2007/0257884 A1 * | 11/2007 | Taira et al. | 345/158 |
| 2008/0055326 A1 * | 3/2008 | Du et al. | 345/553 |
| 2011/0063300 A1 * | 3/2011 | Stauffer et al. | 345/440 |

* cited by examiner

*Primary Examiner* — Daniel Washburn
*Assistant Examiner* — Donna Ricks
(74) *Attorney, Agent, or Firm* — Matthew B. Dernier, Esq.; Gibson & Dernier LLP

(57) ABSTRACT

There is provided a graphics processing system that includes a main processing unit and a graphics processing unit (GPU). The main processing unit puts rendering commands generated using a graphics library in the queue of a command buffer in a main memory. In this process, the library function offered by the graphics library is converted into the rendering commands, without any rendering attributes retained in the library. The GPU reads and executes the rendering commands stacked in the command buffer, and generates rendering data in a frame buffer.

8 Claims, 12 Drawing Sheets

FIG.2A

| INSTRUCTION | DATA |

FIG.2B

| INSTRUCTION | INSTRUCTION |

FIG.2C

| INSTRUCTION | DATA |
|---|---|
| DATA | DATA |
| DATA | DATA |

GRAPHICS PROCESSING APPARATUS

CROSS REFERENCE TO RELATED APPLICATION

This application claims the benefit of U.S. Provisional Patent Application No. 60/865,180, filed Nov. 10, 2006, the entire disclosure of which is hereby incorporated by reference.

BACKGROUND OF THE INVENTION

1. Field of the Invention

The present invention relates to a graphics processing technique.

2. Description of the Related Art

High-quality graphics has been widely used in personal computers and game consoles. For instance, an application such as a game or simulation using high-quality three-dimensional computer graphics is executed, or an image content in which live action and computer graphics are combined is reproduced.

In general, graphics processing is performed in cooperation of a CPU and a Graphics Processing Unit (GPU). The CPU is a general-purpose processor that performs common operations, whereas the GPU is a processor dedicated to performing advanced graphics operations. The CPU performs geometry operations such as a projection transformation based on the three-dimensional model of an object, whereas the GPU performs a rendering process after receiving vertex data from the CPU. The GPU is composed of specialized hardware such as a rasterizer or a pixel shader, and executes the graphics processing by pipelining. Some of the latest GPUs, known as a program shader, have programmable shader functions.

A graphics library is usually provided to support the shader programming. The currently available graphics libraries hide the hardware-specific functions of the GPU, and provide library functions that are not dependent on a particular GPU. Thus, the boundary between hardware and software appears obscure to an application. For this reason, the existing graphics libraries are not suitable for the finely-tuned control, for example, a case where a programmer likes to control the graphics processing at the hardware level of a specific GPU.

In the system configuration where the CPU is involved in graphics processing, if the CPU spends time performing the common processing or spends time in the synchronous processing with the GPU, the CPU will become the bottleneck and the performance of whole system will be degraded.

SUMMARY OF THE INVENTION

The present invention has been made in view of the above circumstances, and has a general purpose of enhancing the flexibility in programming with graphics library. Another purpose of the present invention is to improve the efficiency of graphics processing in a multiprocessor system.

A graphics processing apparatus according to an embodiment of the present invention, comprises: a main processing unit which generates at least one rendering command based on an application program; a memory which includes a command buffer retaining a rendering command sequence of at least one rendering command generated by the main processing unit; and a graphics processing unit which reads the rendering command sequence retained in the command buffer and executes a rendering process. The main processing unit comprises: a main processor which executes a common process; and a sub processor which executes an arithmetic operation relating to graphics. The sub processor generates the rendering command based on the application program in lieu of the main processor, stores in the command buffer the rendering command that has been generated, generates data necessary for executing the rendering command that has been generated, and stores the data in the memory.

Another embodiment of the present invention is a graphics processing apparatus. The apparatus comprises: a main processing unit which generates at least one rendering command based on an application program; a memory which includes a command buffer retaining a rendering command sequence of at least one rendering command generated by the main processing unit; and a graphics processing unit which reads the rendering command sequence retained in the command buffer and executes a rendering process. The main processing unit comprises: a main processor which executes a common process; and a plurality of sub processors which operate independently of each other. Each of the plurality of the sub processors generates the rendering command sequence independently for individual program module, retains the generated rendering command sequence in the command buffer, and generates, as a last command of the rendering command sequence corresponding to a given program module, a jump instruction having a jump destination address set to a head address of the rendering command sequence corresponding to another program module to be executed next.

Optional combinations of the aforementioned constituting elements, and implementations of the invention in the form of methods, processors, apparatuses, systems, recording media, computer programs, data structures, etc. may also be practiced as additional may also be implemented as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2A through FIG. 2C illustrate rendering commands generated by a main processing unit of FIG. 1 with a graphics library;

DETAILED DESCRIPTION OF THE INVENTION

The invention will now be described by reference to the preferred embodiments. This does not intend to limit the scope of the present invention, but to exemplify the invention.

First Embodiment

Figure 1:
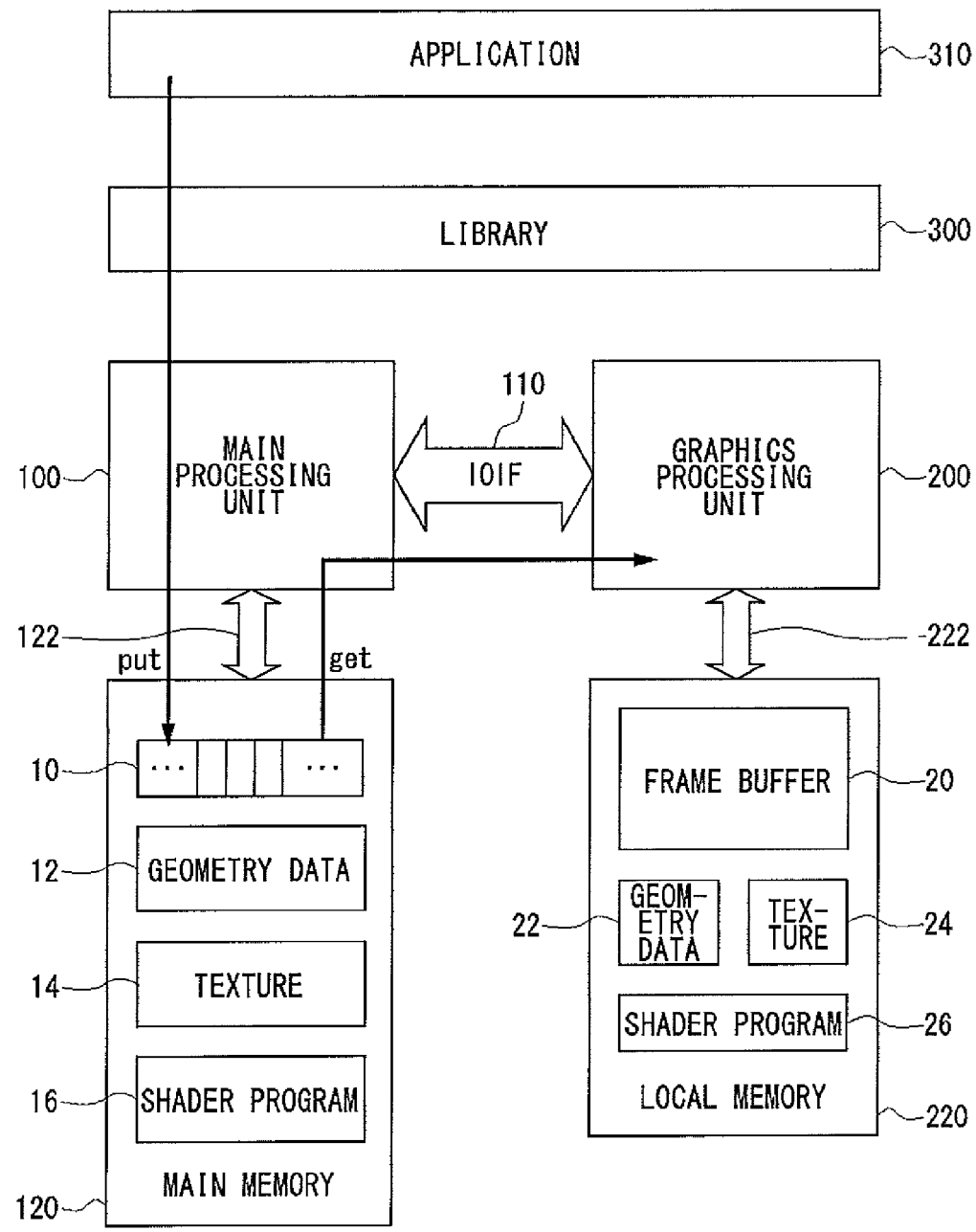
FIG. 1 illustrates a configuration of a graphics processing system according to a first embodiment of the present invention.

FIG. 1 illustrates a configuration of a graphics processing system according to a first embodiment of the present invention. The graphics processing system includes: a main processing unit 100; a graphics processing unit 200; a main memory 120; and a local memory 220.

The main processing unit 100 may be a single main processor, or a multiprocessor system including plural processors. Alternatively, the main processing unit 100 may be a multicore processor in which plural processor cores are integrated into a single package. The graphics processing unit 200 is a graphics chip having a graphics processor core mounted thereon.

An input/output port of the main processing unit 100 and an input/output port of the graphics processing unit (hereinafter, simply referred to as "GPU") 200 are connected to an input/output interface (hereinafter, simply referred to as "IOIF") 110, so that the main processing unit 100 and the GPU 200 can exchange data via the IOIF 110. The IOIF 110 is a very high-speed interface, and the bandwidth thereof is substantially equal to that of a bus 122 connecting the main processing unit 100 and the main memory 120 or that of a bus 222 connecting the GPU 200 and the local memory 220.

A graphics library 300 is a library that generates and manages graphics commands to perform the rendering operation. The graphics library 300 can be called from an application 310 to perform the graphics processing. The graphics library 300 also provides the functions of memory management and data transfer control. Using these functions, the application 310 can perform memory mapping and memory-to-memory transfer of data such as geometry information, texture, shader program or the like.

The main processing unit 100 puts rendering commands that the application 310 has generated by using the graphics library 300 in the queue of a command buffer 10 equipped in the main memory 120. The GPU 200 sequentially reads and processes the rendering commands stacked in the command buffer 10.

The main processing unit 100 writes a rendering command to the command buffer 10 by means of a "put" command. The GPU 200 reads a rendering command from the command buffer 10 by means of a "get" command. There is provided a management mechanism with the get and put pointers, both described later, for the reading and writing of the rendering command from and to the command buffer 10. There is also provided a synchronization function that causes the main processing unit 100 or the GPU 200 to wait while the command buffer 10 is being read or written, so that the application 310 is capable of finely controlling the process that flows from the main processing unit 100 to the GPU 200.

The main processing unit 100 generates geometry data 12 including a vertex coordinate value of a polygon; vertex color; normal vector; and UV value, according to a three-dimensional model of an object, and stores the geometry data 12 in the main memory 120. In addition, the main processing unit 100 stores in the main memory 120 a texture 14 to be mapped to the polygon surface. Furthermore, the main processing unit 100 reads a shader program 16 from a storage medium such as a hard disk, and stores the shader program 16 in the main memory 120.

A memory area of the main memory 120 is memory-mapped to an I/O address space, thereby allowing the GPU 200 to read the memory area of the main memory 120 memory-mapped to the I/O address space, via the IOIF 110. In this manner, the GPU 200 is capable of accessing not only the local memory 220 but also the main memory 120. This configuration permits the data necessary for graphics operation such as the geometry data or texture to be placed not only in the local memory 220 but also in the main memory 120.

A memory area in the main memory 120 where the geometry data 12, the texture 14, and the shader program 16 are stored is memory-mapped to the I/O address space in a memory provided in a controller of the IOIF 110. The GPU 200 reads out the geometry data 12, the texture 14, and the shader program 16 memory-mapped to the I/O address space, via the IOIF 110.

The GPU 200 rasterizes a polygon so as to generate the rasterized data of the polygon by using the geometry data 12 in accordance with the shader program 16, and writes the pixel data in a frame buffer 20. The GPU 200 also maps the texture 14 to the polygon surface, and writes in the frame buffer 20 the pixel data subjected to the texture mapping.

If geometry data 22, a texture 24, and a shader program 26 are stored in the local memory 220, the GPU 200 reads the above pieces of data from the local memory 220 so as to use the data for the graphics operation. The above pieces of data may be transferred from the main memory 120 to the local memory 220 by DMA in advance, or the GPU 200 may read the data from the main memory 120 via the IOIF 110 to store the data in the local memory 220.

FIG. 2A through FIG. 2C illustrate the rendering commands generated by the main processing unit 100 with the use of the graphics library 300. In general, the rendering command includes an instruction and data, as depicted in FIG. 2A. The instruction described herein is included in an instruction set to be used by the GPU 200, and is dependent on the graphics chip. The graphics library 300 offers the function of converting a graphics function into an instruction/instructions executable by the GPU 200.

In some cases, the rendering command is composed of instructions only, as depicted in FIG. 2B, whereas in other cases, the rendering command is composed of an instruction and plural pieces of data attached thereto, as depicted in FIG. 2C. Hereinafter, the rendering command will simply be referred to as "command".

Figure 3:
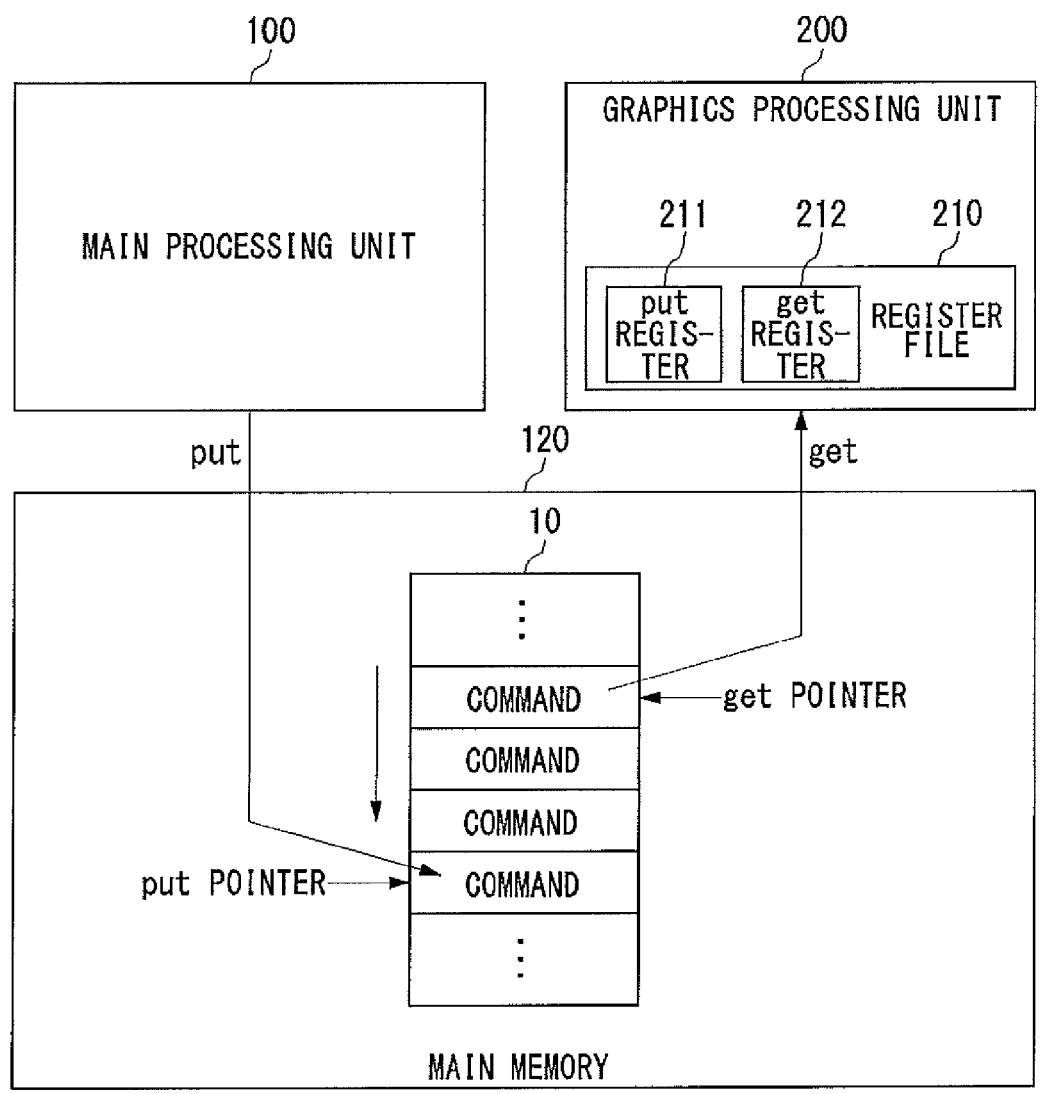
FIG. 3 illustrates a mechanism of managing reading and writing a command from and to a command buffer according to the first embodiment of the present invention.

FIG. 3 illustrates a mechanism of managing reading and writing a command from and to the command buffer 10. The main processing unit 100 issues a "put" command to write a command in the command buffer 10. Meanwhile, the GPU 200 issues a "get" command to read a command from the command buffer 10. In the figure, the commands are sequentially written in the command buffer 10 from top to bottom, and the written commands are sequentially read from top to bottom. The command buffer 10 is implemented by a ring buffer, as an example.

The "get" and "put" pointers are used to manage reading from and writing to the command buffer 10, respectively. The "put" pointer indicates a position (address) in the command buffer 10 at which the main processing unit 100 has completed writing a command last time, whereas the "get" pointer indicates the position (address) in the command buffer 10 from which the GPU 200 is to read a command next time. The "put" and "get" pointers are sometimes called "write" and "read" pointers respectively.

The main processing unit 100, when finishing writing the command to the command buffer 10, moves the "put" pointer forward to the position where the command has been written. When the "get" pointer and the "put" pointer indicate different positions, the GPU 200 reads the command from the command buffer 10. The GPU 200, when finishing reading the command from the command buffer 10, moves the "get" pointer to the next one. The commands are successively read from the command buffer 10 as if the "get" pointer were following the "put" pointer. When the "get" pointer and the "put" pointer indicate an identical position, that is, when no more commands to be read are left, the GPU 200 stops reading and waits for a new command to be written. The application 310, after storing the command in the command buffer 10, moves the "put" pointer forward, thereby causing the GPU 200 to read a new command.

The "put" pointer and the "get" pointer are respectively mapped to a put register 211 and a get register 212 in a register file 210 managed by the GPU 200. The GPU 200 is capable of acquiring addresses in the command buffer 10 respectively indicated by the "put" and "get" pointers, by referring to values of the above corresponding registers.

A description will now be given of a mechanism of converting the graphics function into the rendering command(s) in the graphics library 300 and then stacking the rendering command(s) in the command buffer 10, when the graphics function offered by the graphics library 300 is called in an application program. First, for comparison, the mechanism of generating the rendering command(s) by using a common graphics library will be described. Secondly, the mechanism of generating the rendering command(s) by using the graphics library 300 according to the present embodiment will be described.

Figure 4A:
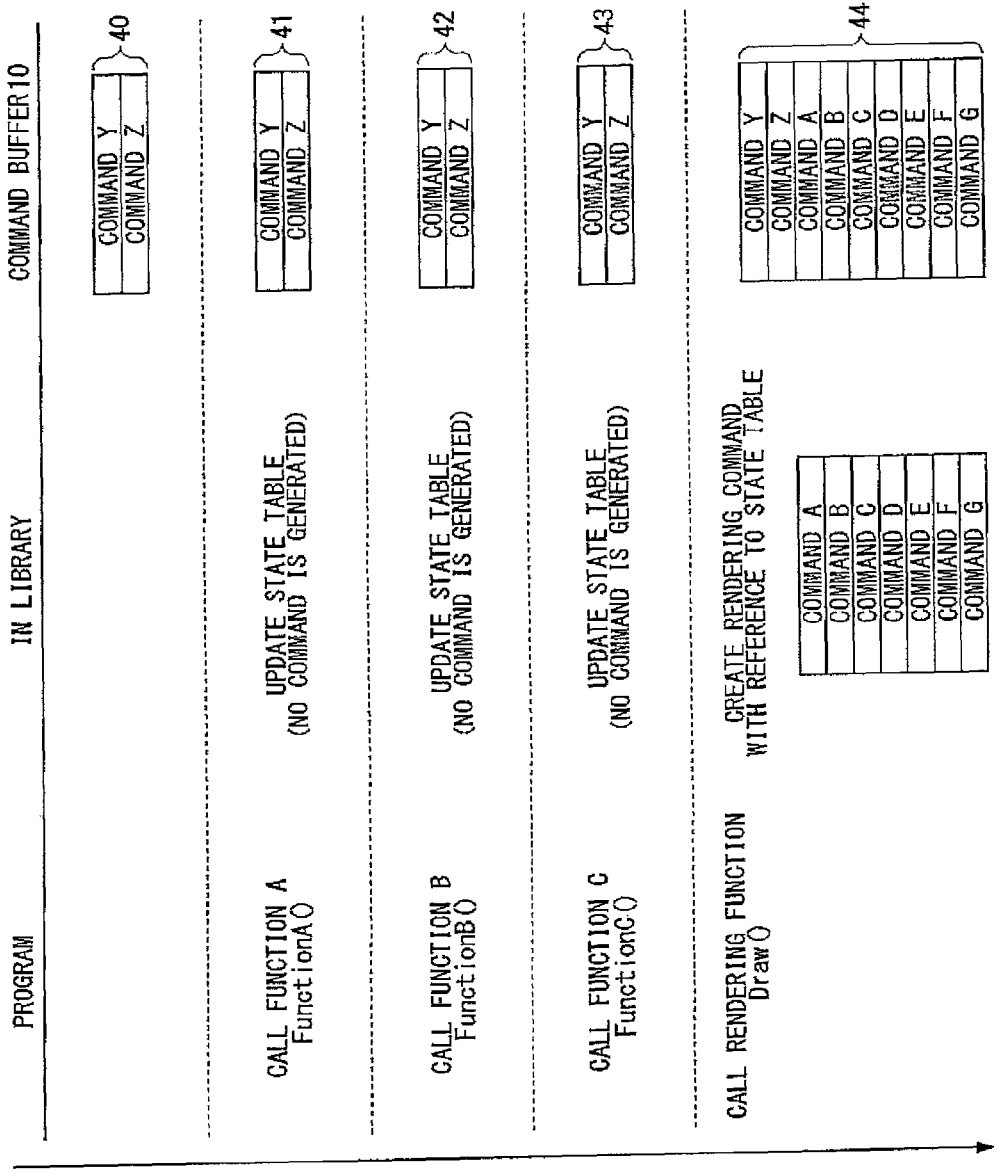
FIG. 4A illustrates how rendering commands are generated by a common graphics library.

FIG. 4A illustrates how the rendering commands are generated by a common graphics library. The program proceeds from top to bottom in the figure. Two commands Y and Z are stored in the command buffer 10 at the beginning (command sequence 40). When a function A is called in a program, the state table storing rendering attributes is updated in the library. However, any rendering command has not been generated by this point of time. Therefore, the status where only the two commands Y and Z are stored in the command buffer 10 still continues (command sequence 41).

Subsequently, as the program proceeds, functions B and C are called. However, only the state table is updated in the library, and no command is generated. Therefore, the status where only the two commands Y and Z are stored in the command buffer 10 further continues (command sequences 42 and 43).

Lastly, when the rendering function is read, commands A through G are generated with reference to the state table retained in the library, and are then stacked in the command buffer 10. This results in the status where commands A through G that have been newly generated are stored in addition to the already existing two commands Y and Z (command sequence 44).

As stated, in a common graphics library, for example, in a library for a commercially available shader programming language or in an open-source graphics library, an instruction unique to a graphics chip is generated at the time which is convenient for the library, while the rendering attributes are being retained and updated in the library. The rendering attributes retained in the graphics library may include a background color, a parameter of blending function, a texture attribute, etc.

The rendering commands that achieve the graphics function are different depending on the graphics chip. In addition, some graphics chips have unique extensions. To hide the instructions dependent on the graphics chip, the existing graphics library retains the rendering attributes in the state table, and then updates the rendering attributes retained in the state table according to the graphics function to be called. The existing graphics library finally creates the rendering commands suitable for the graphics chip. This function of the graphics library is convenient in that a programmer is able to write an application program regardless of the specifications unique to the graphics chip. In particular, this facilitates the programming for a high-performance graphics chip with a rich instruction set. This also allows software to make up for the function that is not supported by the hardware of the graphics chip and fulfill the function on a CPU.

The existing graphics libraries, however, have the following disadvantages.

(1) The processing of each function is slow. This is because the rendering attributes retained in the library need to be updated and then tested to confirm whether the rendering attributes are not contradictory to another piece of related information, so that the CPU requires time for calculation.

(2) The boundary between hardware and software appears unclear to an application. To put in other words, what is obscure to the application is when and what kind of a rendering command is generated by the graphics library depending on the graphics function that has been called. It is unknown to what extent the function of the graphics chip covers and from where the processing is performed by software, so debugging is difficult. It is also difficult to tune the program and increase the speed thereof, and it is also difficult to analyze the cause of the performance degradation.

(3) The operational flexibility of the memory is low. Since it is unclear when and how the command buffer is created, it is difficult to manage the memory or establish synchronization in the graphics library.

(4) Multiple rendering command lists cannot be generated by the graphics library.

As discussed above, the existing common graphics libraries cannot meet the advanced needs of programmers who like to manage the graphics function at the hardware level or to control the graphics function in a fine granularity. For this reason, according to the present embodiment, there is provided the graphics library 300 specialized for the GPU 200 so as to enhance the programming flexibility and to enable a flexible memory management.

Figure 4B:
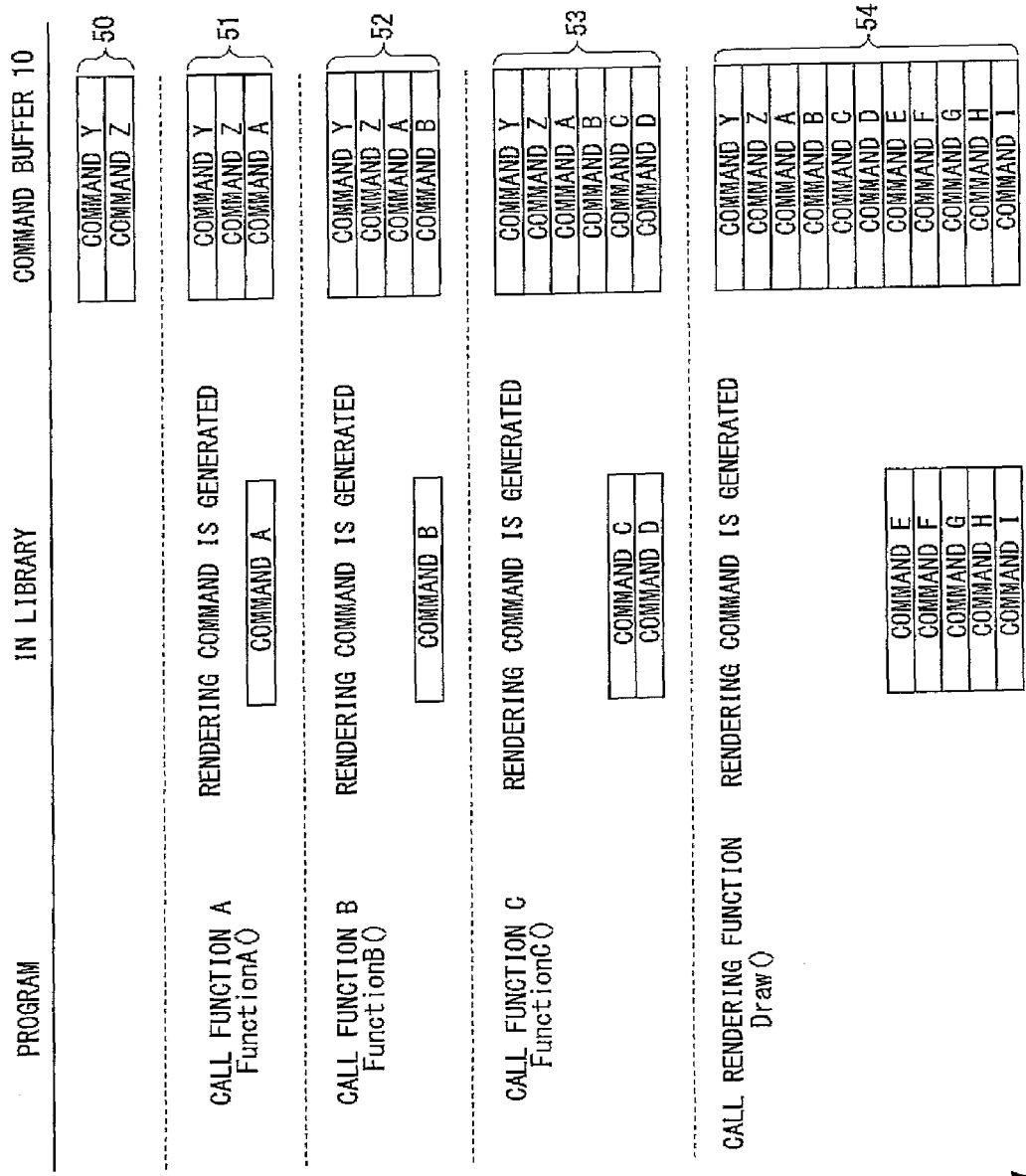
FIG. 4B illustrates how rendering commands are generated by the graphics library according to the first embodiment of the present invention.

FIG. 4B illustrates how the rendering commands are generated by the graphics library 300 according to an embodiment of the present invention. Unlike the existing graphics library illustrated in FIG. 4A, the graphics library 300 according to the present embodiment does not retain any rendering attributes. Therefore, each time the respective function A, B or C is called, the rendering command(s) is/are generated in the graphics library 300.

Two commands Y and Z are stored in the command buffer 10 at the beginning (command sequence 50). When the function A is called in a program, a command A for the GPU 200 is generated in the graphics library 300 and then stacked in the command buffer 10 (command sequence 51).

In a similar manner, when the function B is called, a command B for the GPU 200 is generated in the graphics library 300 and then stacked in the command buffer 10 (command sequence 52). When the function C is further called, commands C and D for the GPU 200 are generated in the graphics library 300 and then stacked in the command buffer 10 (command sequence 53).

Lastly, when the rendering function is read, commands E through I for the GPU 200 are generated in the graphics library 300 and then stacked in the command buffer 10 (command sequence 54).

The difference between FIG. 4A and FIG. 4B will be described with a specific example. It is assumed that the program below is executed by use of OpenGL (Open Graphics Library), which is an existing graphics library.

| | |
|---|---|
| glBlendColor( ); | //Set blend color |
| glAlphaFunc( ); | //Set alpha test function |
| glViewport( ); | //Set view port area |
| glDepthRange( ); | //Set correspondence between Z value and depth value |
| glFrontFace( ); | //Define both sides of polygon |
| glScissor( ); | //Set scissoring box |
| glDrawElement( ); | //Render primitive |

When the functions of glBlendColor( ), glAlphaFunc( ), glViewport( ), glDepthRange( ), glFrontFace( ), and glScissor( ) are called, the rendering attributes including the blend color, alpha test function, view port area, correspondence between Z value and depth, both sides of polygon, and scissoring box are respectively set in the graphics library. It is not until the rendering function of glDrawElement( ) is called finally that the rendering commands dedicated to the graphics chip are generated on the basis of the rendering attributes.

Each time the function is called, the rendering attributes retained in the library are updated in the existing graphics library. The status of the rendering attributes is changed according to the library function that has been called before the rendering function is called finally, so the rendering commands actually generated may vary depending on the status of the rendering attributes. This is because the existing graphics library includes information on the rendering attributes therein, and therefore, once a certain function is called and some of the rendering attributes are changed, the changed rendering attributes will be inherited by the next function call.

In addition, if some of the rendering attributes are overwritten due to a dependence relationship between the library functions, the rendering commands to be finally generated will change depending on the order of calling the library functions. An example will be described in which a function glTexImage2D( ) that sets a texture image and a function glTexParameter( ) that sets a texture parameter are called. The rendering commands finally executed on the graphic chip are different between the case where glTexImage2D( ) is first called to set the attribute of the texture image and thereafter glTexParameter( ) is called to set the texture parameter and the case where glTexParameter( ) is first called to set the texture parameter and thereafter glTexImage2D( ) is called to set the attribute of the texture image.

Meanwhile, the following is a similar program written by using the graphics library 300 according to the present embodiment.

| | |
|---|---|
| gcmSetBlendColor( ); | //Set blend color |
| gcmSetAlphaFunc( ); | //Set alpha test function |
| gcmSetViewport( ); | //Set view port area |
| gcmSetFrontFace( ); | //Define both sides of polygon |
| gcmSetScissor( ); | //Set scissoring box |
| gcmSetDrawIndex( ); | //Render primitive |

When the functions of gcmSetBlendColor( ), gcmSetAlphaFunc( ), gcmSetViewport( ), gcmSetFrontFace( ), and gcmSetScissor( ) are called, the command for setting the blend color, the command for setting the alpha test function, the command for setting the view point area, the command for setting both sides of polygon, and the command for setting the scissoring box are respectively generated in the graphics library 300. When the rendering function gcmSetDrawIndex( ) is called finally, the command for rendering the primitive is generated. There are no rendering attributes retained in the graphics library 300. As soon as the library function is called, the library function is converted into the respective setting command.

Since no rendering attributes are retained in the graphics library 300 according to the present embodiment, the library function is not affected by the status of the rendering attributes. Whatever rendering commands are set by previously calling other library functions, the same rendering command(s) is/are always generated for the same library function. Also, any change in the order of calling the library functions does not change the rendering commands to be generated. For example, if a function of setting the texture image gcmSetTexture( ), a function of setting the texture address gcmSetTextureAddress( ), and a function of setting the texture filtering gcmSetTextureFilter( ) are called, the same rendering commands will be generated regardless of whether gcmSetTexture( ), gcmSetTextureAddress( ), and gcmSetTextureFilter( ) are called in this order or gcmSetTextureFilter( ), gcmSetTexture( ), and gcmSetTextureAddress( ) are called in this order.

There are no rendering attributes retained in the library, thereby allowing the graphics library 300 to generate the commands in multiple command buffers. By switching between a first command buffer and a second command buffer, the graphics library 300 creates the commands in the respective command buffers in such a manner as to create a command in the first command buffer, and then create another command in the second command buffer, and further create yet another command in the first command buffer again. Even in the above case, the graphics library 300 does not include any rendering attributes therein, thereby allowing the graphics library 300 to create the commands in the two command buffers independently, without the two buffers affecting each other.

On the other hand, the existing graphics library retains the rendering attributes therein. Therefore, if a given rendering attribute is changed for a command generated in the first command buffer and another command is successively generated in the second command buffer, the rendering attribute that has been set in the first command buffer will be inherited to the command generation in the second command buffer. In order for the existing graphics library to generate commands in the two command buffers independently as the graphics library 300 according to the present embodiment does, the following procedure should be taken. When the existing graphics library creates a command in the first command buffer, and then creates another command in the second command buffer, and further creates yet another command in the first command buffer again, the rendering attribute that has been set when the command was generated in the second command buffer should be reset and the setting status of the rendering attributes should be returned to the status occurring when the command was generated in the first command buffer. However, it is not efficient, from the perspective of the calculation time or the amount of memory, to restore the setting of the rendering attributes to the previous one each time the command buffer is switched, as described above. Therefore, it is realistic to create the commands in a single command buffer, and in general, the existing graphics library is not configured such that the commands can be generated in multiple command buffers.

Since the library function in the graphics library 300 is immediately converted into the rendering command(s) dedicated to the graphics chip, it is difficult to make up for the function that is not supported by the hardware of the GPU 200, by means of software processing performed on the main processing unit 100. Nevertheless, the graphics library 300 has the following advantages.

(1) The processing of each function is fast. This is because no rendering attributes are retained in the library and the information on the rendering attributes need not be verified.

(2) The boundary between hardware and software appears clear to an application, thereby allowing a programmer to understand with accuracy when and what kind of rendering command is generated by the graphics library based on the graphics function that has been called. This facilitates debugging, and also facilitates the tuning of the program to increase the speed thereof, and further facilitates the analysis of the cause of the performance degradation.

(3) The graphics library can be incorporated into the memory management mechanism of an application. Since it is clear that when and how the command buffer is created, the memory management or the establishment of synchronization in the graphics library can be done with ease.

(4) Multiple rendering command lists can be generated in the graphics library.

(5) Since the communication between the GPU 200 and the main processing unit 100, which basically operate in an asynchronous fashion, becomes apparent to a programmer, the programmer is able to trace the process that proceeds along the timeline.

(6) The setting of the rendering attributes for hardware can be tracked on the application side. This allows the programmer to finely tune the performance of the application.

Hereinafter, a method of using multiple rendering command lists in the graphics library 300 and an application thereof will be described.

Figure 5:
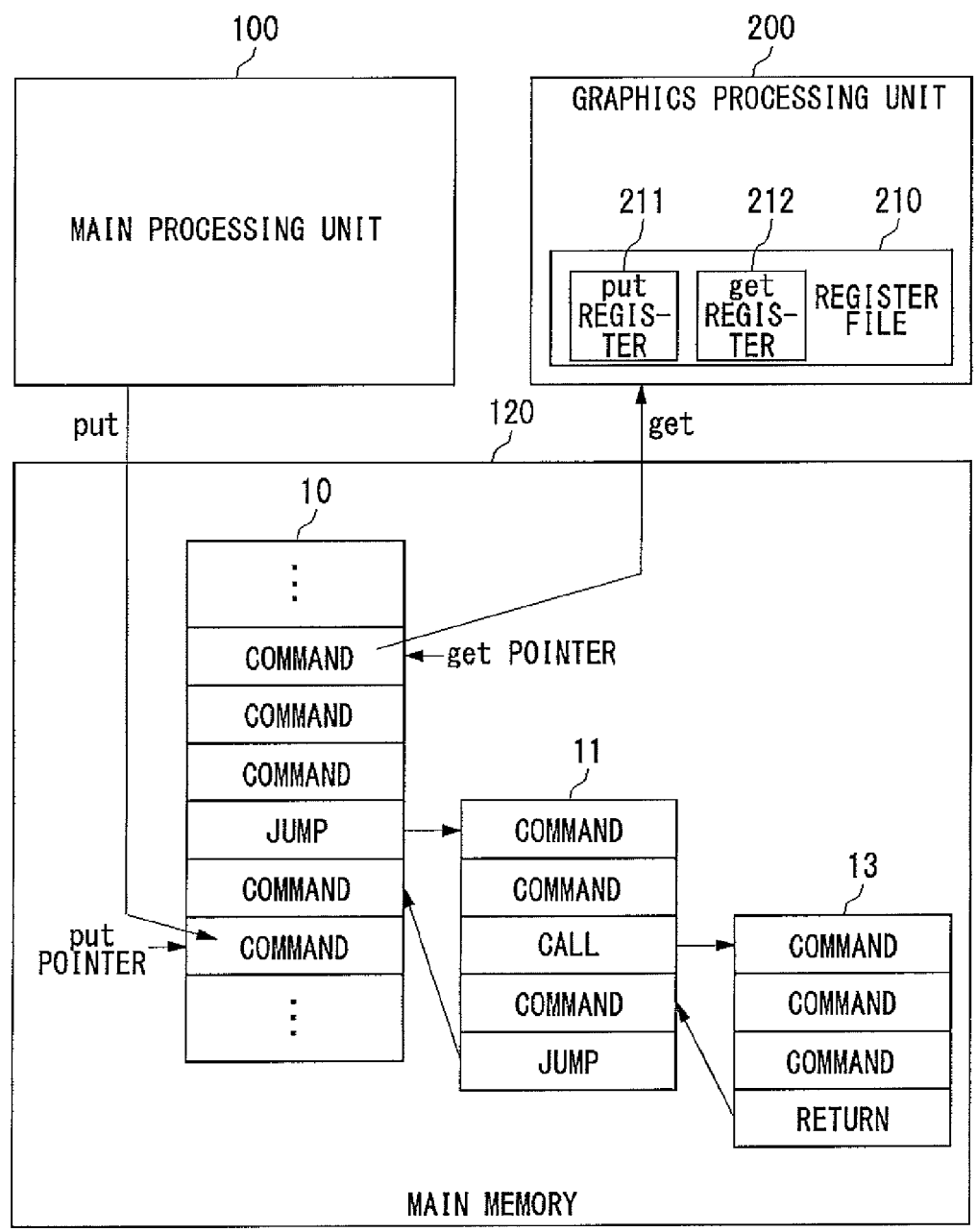
FIG. 5 illustrates a flow control of the command buffer according to the first embodiment of the present invention.

FIG. 5 illustrates a flow control of the command buffer 10. The graphics library 300 supports commands relating to the flow control including jump and call/return. Jump is a command to jump the "get" pointer to the address designated by a parameter, thereby allowing the GPU 200 to read the command list at an arbitrary position. Call is a command to jump the "get" pointer to the address designated by a parameter in the same manner as jump and then causes the GPU 200 to read the command list at the position to which the "get" pointer has been jumped. The call and return commands are used in pairs. The address of the command subsequent to the call command is set to the return address of the return command.

The figure illustrates an example of the flow control, described below. (1) The jump command in the command list of the command buffer 10 is executed, and control is then jumped to another command list 11. (2) The call command is executed in the command list 11 to which control has been jumped, and control is further jumped to another command list 13. (3) The return command is executed in the command list 13 that is a call destination, and control is then returned to the command list 11 that is a call source. (4) The jump command is executed in the command list 11 that is the call source, and control is then jumped to the command buffer 10.

The flow of the program can be controlled by linking the multiple command lists arbitrarily with the use of the jump and/or call commands. Furthermore, the program is divided into modules, and the command list for each module is created and retained. The command list thus created on a module basis is referred to by use of the jump and/or call commands so that the command list can be reused.

Figure 6A:
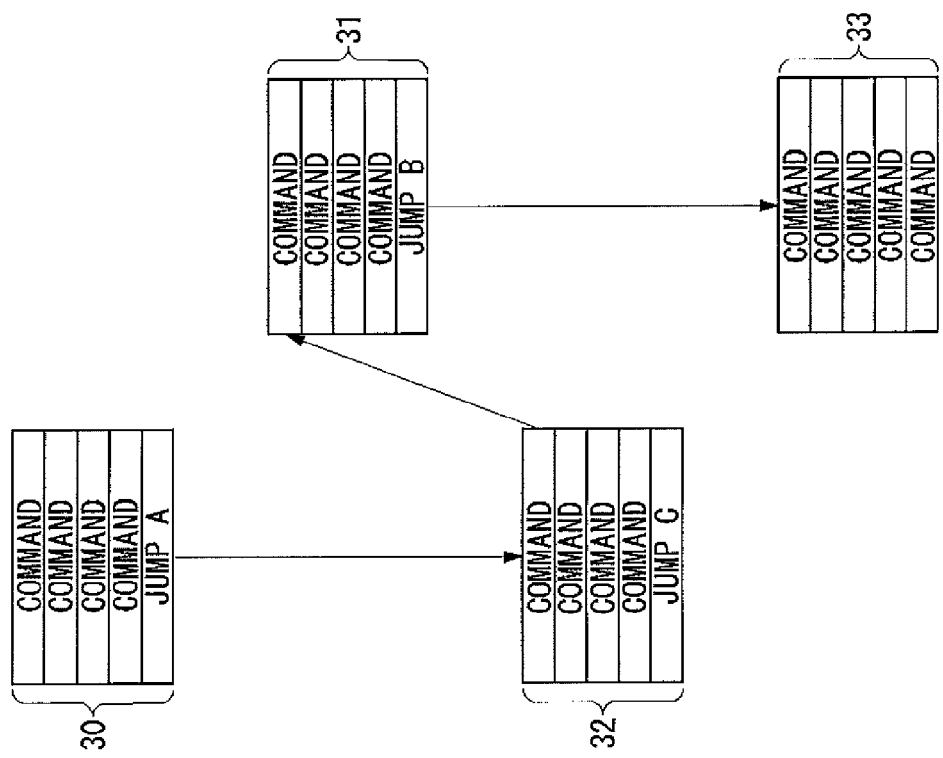
FIG. 6A and FIG. 6B illustrate multiple command lists linked by jump commands.
Figure 6B:
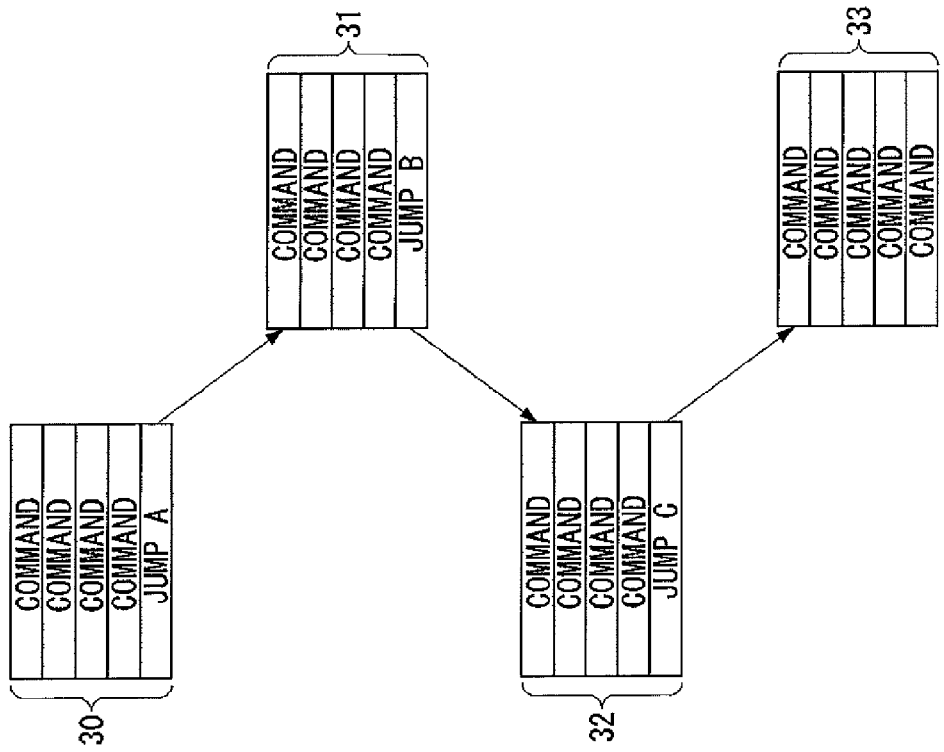

FIG. 6A and FIG. 6B illustrate the multiple command lists linked by the jump commands. Referring now to FIG. 6A, a jump A in a first command list 30 is a command to jump to the head address of a second command list 31. A jump B in the second command list 31 is a command to jump to the head address of a third command list 32. A jump C in the third command list 32 is a command to jump to the head address of a fourth command list 33. Thus, the commands are read and executed by the GPU 200 in the order of the first command list 30, the second command list 31, the third command list 32, and the fourth command list 33.

Referring now to FIG. 6B, the order of executing the command lists can be changed with ease by changing the jump destination address of the jump command. The jump destination address of the jump A in the first command list 30 is changed to the head address of the third command list 32, and the jump destination address of the jump C in the third command list 32 is changed to the head address of the second command list 31. Thus, the commands are read and executed by the GPU 200 in the order of the first command list 30, the third command list 32, the second command list 31, and the fourth command list 33.

Figure 7:
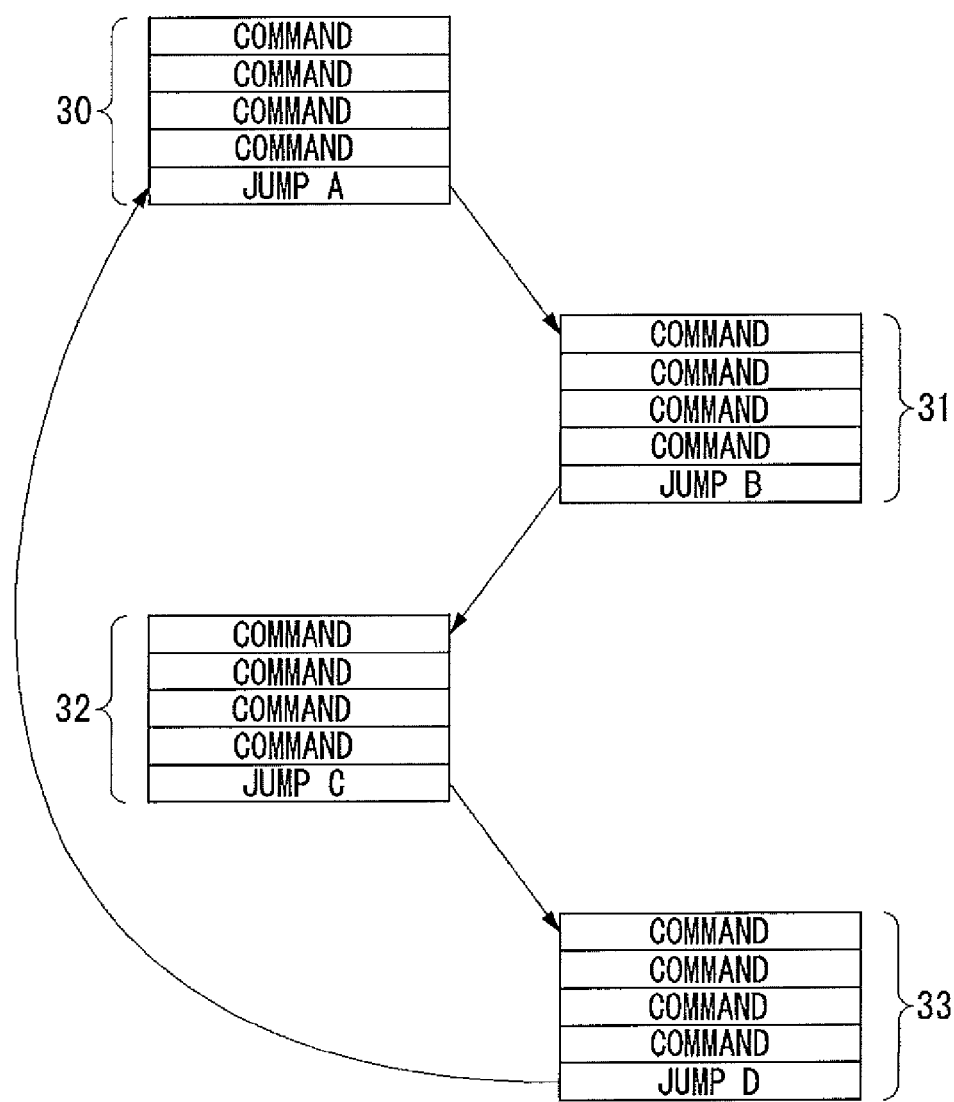
FIG. 7 illustrates how a loop process is executed by the jump commands.

FIG. 7 illustrates how a loop process is executed by the jump commands. The jump A in the first command list 30 is to jump to the head address of the second command list 31. The jump B of the second command list 31 is to jump to the head address of the third command list 32. The jump C of the third command list 32 is to jump to the head address of the fourth command list 33. A jump D of the fourth command list 33 is to jump to the head address of the first command list 30. In this way, the loop process is performed such that the first command list 30 through the fourth command list 33 are sequentially repeated in this order.

Figure 8A:
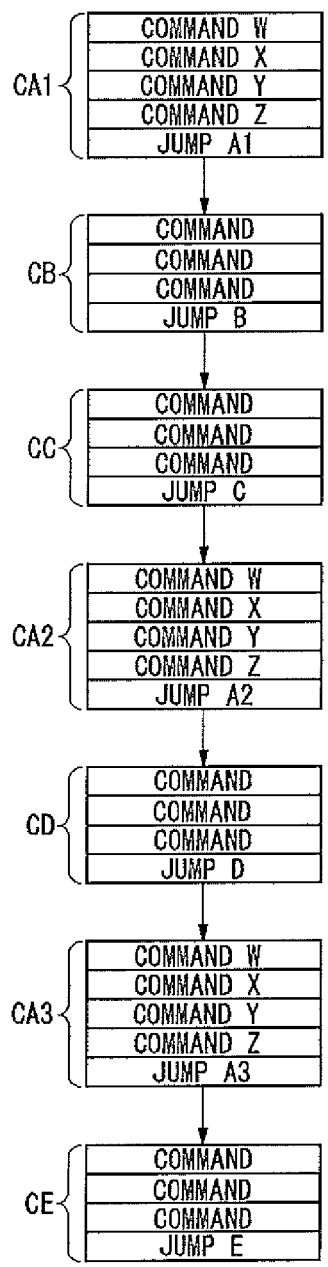
FIG. 8A and FIG. 8B illustrate how a command list is reused by the jump commands.
Figure 8B:
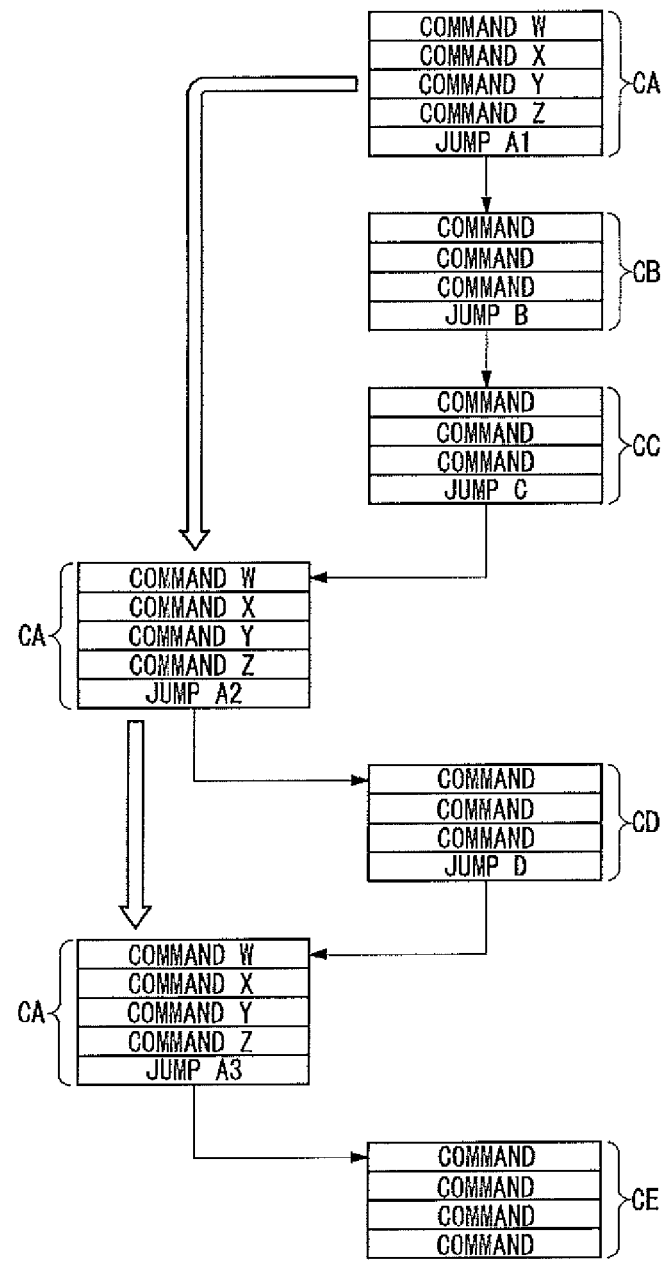

FIG. 8A and FIG. 8B illustrate how the command list is reused by the jump commands. For comparison, FIG. 8A illustrates the case where the command list is not reused. A command list CA1 is a command sequence corresponding to a program module X to be used repeatedly, and includes four commands W, X, Y, and Z. A jump A1, which is the last command in the command list CA1, is to jump to a next command list CB. The jump B, which is the last command in the command list CB, is to further jump to a command list CC.

After the command list CC is executed, the program module X is called again and a command list CA2 including the four commands W, X, Y, and Z, which are the same as those in the command list CA1, is newly created. The jump destination address of the jump C that is the last command in the command list CC is set to the head address of the command list CA2 that has been newly created.

The jump destination address of a jump A2, which is the last command in the command list CA2 that has been newly created, is set to the head address of a command list CD to be executed next. After the command list CD is executed, the program module X is called again. Also in this case, a command list CA3 including the four commands W, X, Y, and Z, which are the same as those in the command list CA1, is newly created. The jump destination address of the jump D, which is the last command in the command list CD, is set to the head address of the command list CA3 that has been newly created. The jump destination address of a jump A3, which is the last command in the command list CA3 that has been newly created, is set to the head address of a command list CE to be executed next.

It is inefficient to generate the same command list repeatedly as described, when the identical program module X is called repeatedly. Therefore, in the present embodiment, the command list CA that is initially created is reused, as illustrated in FIG. 8B. Unlike FIG. 8A, the command list CA that has been initially created is retained in a command buffer so that it can be reused. When the command list CC is executed and the program module X is then called, the command list CA is reused and the jump destination address of the jump C, which is the last command in the command list CC, is set to the head address of the command list CA. The jump destination address of the jump A2, which is the last command in command list CA to be reused, is set to the head address of the command list CD to be executed next.

After the command list CD is executed, the program module X is called again. The command list CA that has already existed is reused and the jump destination address of the jump D, which is the last command in the command list CD, is set to the head address of the command list CA. The jump destination address of the jump A3, which is the last command in the command list CA to be reused, is set to the head address of the command list CE to be executed next.

In FIG. 8B, the process is configured to jump to the head address of the command list CA to be reused by the jump command. In lieu of the jump command, however, a call command may be used to jump to the head address of the command list CA. In such a case, the return command will be executed as the last command in the command list CA that is a call destination, and control will be returned to the call source and then will be jumped to the next command list.

As described heretofore, the multiple command lists can be generated, linked, and reused arbitrarily by using the graphics library 300. An independent command buffer may be provided for each command list, or multiple command lists may be stored in a single command buffer.

The command list can be created by the graphics library 300 by using an independent command buffer provided for each program module. For instance, a command buffer different from object to object to be rendered can be used, or a separate command buffer can be used to render the background. Thus, the rendering process can be divided into plural components, or the task can be divided so that each of the tasks can be operated separately and individually. In addition, the object to be rendered can be changed to restructure a scene with ease by arbitrarily selecting the command buffer prepared for each object.

The use efficiency of the memory is improved by reusing the command list that has been generated once, and the processing load of the command generation process performed by the main processing unit 100 is significantly reduced.

In the case where the main processing unit 100 is a multiprocessor or the parallel processing is enabled in multi-threaded processing or the like, multiple command lists may be created in parallel. Since multiple command buffers can be set independently by the graphics library 300, the program can be executed in parallel by a multiprocessor or in multi-threaded processing. This allows the creation of the command lists in parallel.

Second Embodiment

Figure 9:
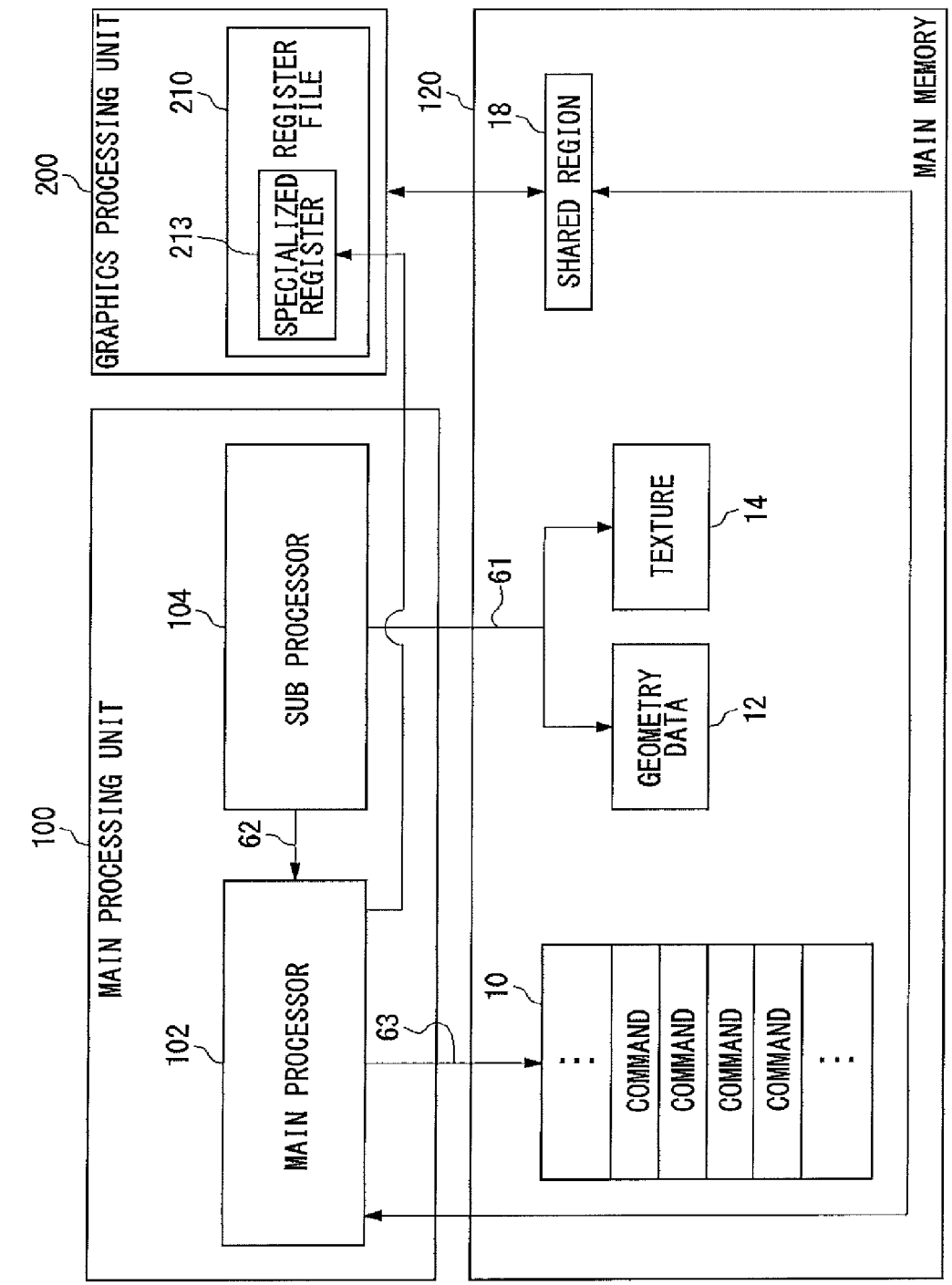
FIG. 9 illustrates a configuration of a graphics processing system, according to a second embodiment of the present invention, in which a main processor is involved in the graphics processing and the main processor, a sub processor, and a graphics processing unit (GPU) operate in cooperation with each other.
Figure 10:
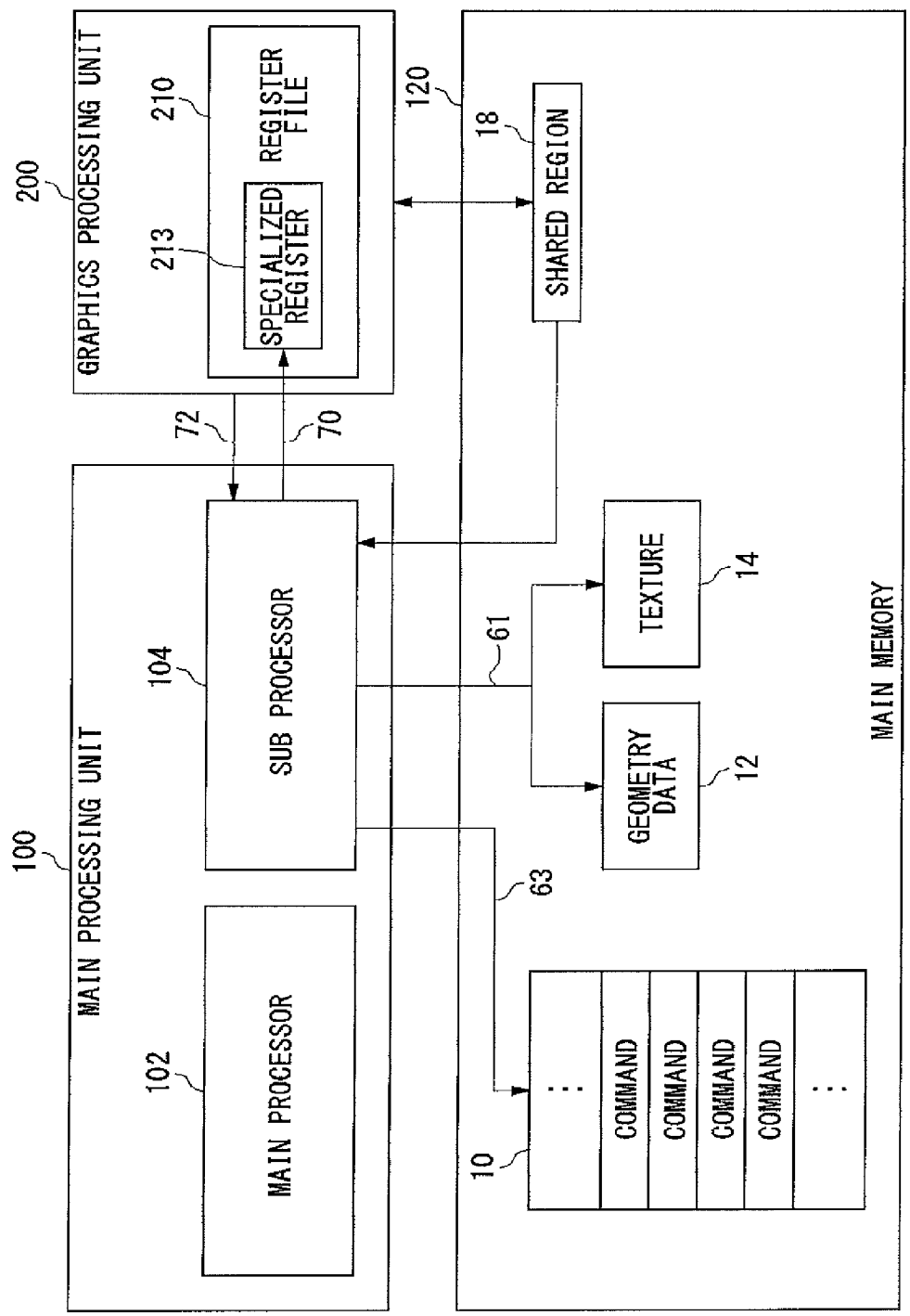
FIG. 10 illustrates another configuration of a graphics processing system, according to the second embodiment of the present invention, in which the main processor is not involved in the graphics processing and the sub processor and the GPU operate in cooperation with each other.

FIG. 9 and FIG. 10 illustrate configurations of the graphics processing system according to a second embodiment of the present invention. The main processing unit 100 according to the second embodiment is a multiprocessor including a main processor 102 and a sub processor 104. The main processor 102 is a processor that executes a common process, whereas the sub processor 104 is a processor that executes an operation relating to graphics. The sub processor 104 is suitable for performing the function dedicated to graphics such as, for example, the vertex shader, texture mapping, etc.

In the second embodiment of the present invention, the cooperative operation of the main processing unit 100 and the GPU 200, both having been described in the first embodiment, will now be described. The configuration and operation that have been described in the first embodiment of the present invention is applicable to those in the second embodiment of the present invention. Thus, the overlapping description will be omitted.

Referring now to FIG. 9, the main processor 102 is involved in the graphics processing, and the main processor 102, the sub processor 104, and the GPU 200 operate in cooperation with each other.

The sub processor 104 generates the geometry data 12 and the texture 14 necessary for executing the rendering command, in accordance with the application program (as indicated by a reference numeral 61). The sub processor 104 notifies the main processor 102 that the data necessary for executing the rendering command has been generated (as indicated by a reference numeral 62). After receiving the notification from the sub processor 104, the main processor 102 generates the rendering commands in the command buffer 10 (as indicated by a reference numeral 63).

In this manner, after the sub processor 104 generates the geometry data 12 and the texture 14 necessary for executing the rendering commands, the main processor 102 generates the rendering commands accordingly. Therefore, it is necessary to establish synchronization by the notification from the sub processor 104 to the main processor 102.

Upon completion of generating the rendering commands, the main processor 102 informs the GPU 200 of an address in the main memory 120 to be read from, the size to be read, and the timing of the reading, so as to cause the GPU 200 to read the commands stacked in the command buffer 10. In the first embodiment, a description has been given of an example where the "get" pointer and the "put" pointer are used to manage the reading from and the writing to the command buffer 10, respectively. In addition to the reading from and the writing to the command buffer 10, it is necessary to establish synchronization between the main processor 102 and the GPU 200, when the completion of the rendering process is notified or when the information on the rendering attributes to be updated in the runtime during the rendering process is obtained.

To establish synchronization between the main processor 102 and the GPU 200, the main processor 102 notifies the GPU 200 by writing data in a specialized register 213 in the register file 210 of the GPU 200. Alternatively, the main processor 102 and the GPU 200 read data from a shared region 18 in the main memory 120 or write data thereto, thereby allowing the main processor 102 and the GPU 200 to establish synchronization.

In the configuration of FIG. 9, since the main processor 102 generates the rendering commands, the processing load of the main processor 102 is increased and the performance of the whole system is degraded. In addition, the synchronous processing is necessary between the main processor 102 and the sub processor 104, and is also necessary between the main processor 102 and the GPU 200. While the main processor 102 is performing another process, the latency of the synchronous processing may grow and the real-time performance in the graphics processing will be degraded.

The main processor 102 plays more and more roles in a real-time application such as a game. The main processor 102 performs graphics processing, display output, sound output, recognition processing such as sound recognition, image recognition or the like, simulation processing such as physical simulation, control of various input/output devices, streaming processing such as coding or decoding of image or sound, artificial intelligence, security processing, etc. Accordingly, the main processor 102 will become a bottleneck and the performance of the application will be limited. Therefore, the main processor 102 is configured to be dedicated to input/output processing, security processing or the like, that is executable only by the main processor 102, while the processing relating to the graphics is offloaded from the main processor 102 in order to reduce the processing load thereof.

Graphics visible to a user demands high quality and it requires a large amount of data to be processed accordingly. Therefore, it is very effective to offload the graphics processing from the main processor 102, resulting in that the main processor 102 can concentrate on the common processing that the main processor 102 has to operate primarily.

In order to establish a system that performs the rendering process without using the main processor 102, the generation of the rendering command, the control of the command buffer 10, and the synchronous processing with the GPU 200 have to be accomplished without the intervention by the main processor 102.

FIG. 10 illustrates a configuration of the graphics processing system in which the main processor 102 is not involved in the graphics processing and the sub processor 104 and the GPU 200 operate in cooperation with each other.

The sub processor 104 generates the geometry data 12 and the texture 14 necessary for executing the rendering commands (reference numeral 61), and also generates the rendering commands in the command buffer 10 in lieu of the main processor 102 (reference numeral 63). Since the sub processor 104 generates the rendering commands, the notification from the sub processor 104 to the main processor 102, as depicted in FIG. 9, is no longer necessary.

The control of the command buffer 10 is accomplished by communicating the information on the rendering command list that has been generated, from the sub processor 104 to the GPU 200. This communication is accomplished, by means of the sub processor 104 updating a register of the GPU 200 by DMA. Since the timing of the communication can be controlled by the sub processor 104 that generates the rendering commands, the synchronization does not have to be established relying on the intervention by the main processor 102.

The synchronous processing between the sub processor 104 and the GPU 200 does not have to be performed relying on the intervention by the main processor 102, and the sub processor 104 can establish synchronization with the GPU 200 directly. To establish synchronization, there may be a method by which the sub processor 104 controls the specialized register 213 in the register file 210 of the GPU 200 (reference numeral 70), another method by which the sub processor 104 and the GPU 200 read from and write to the shared region 18 in the main memory 120, and yet another method by which the GPU 200 gives an interrupt to the sub processor 104 (reference numeral 72). This eliminates the necessity of the intervention by the main processor 102 in the synchronous processing, thereby avoiding the situation where the main processor 102 adversely affects the real-time performance as a bottleneck.

Third Embodiment

Figure 11:
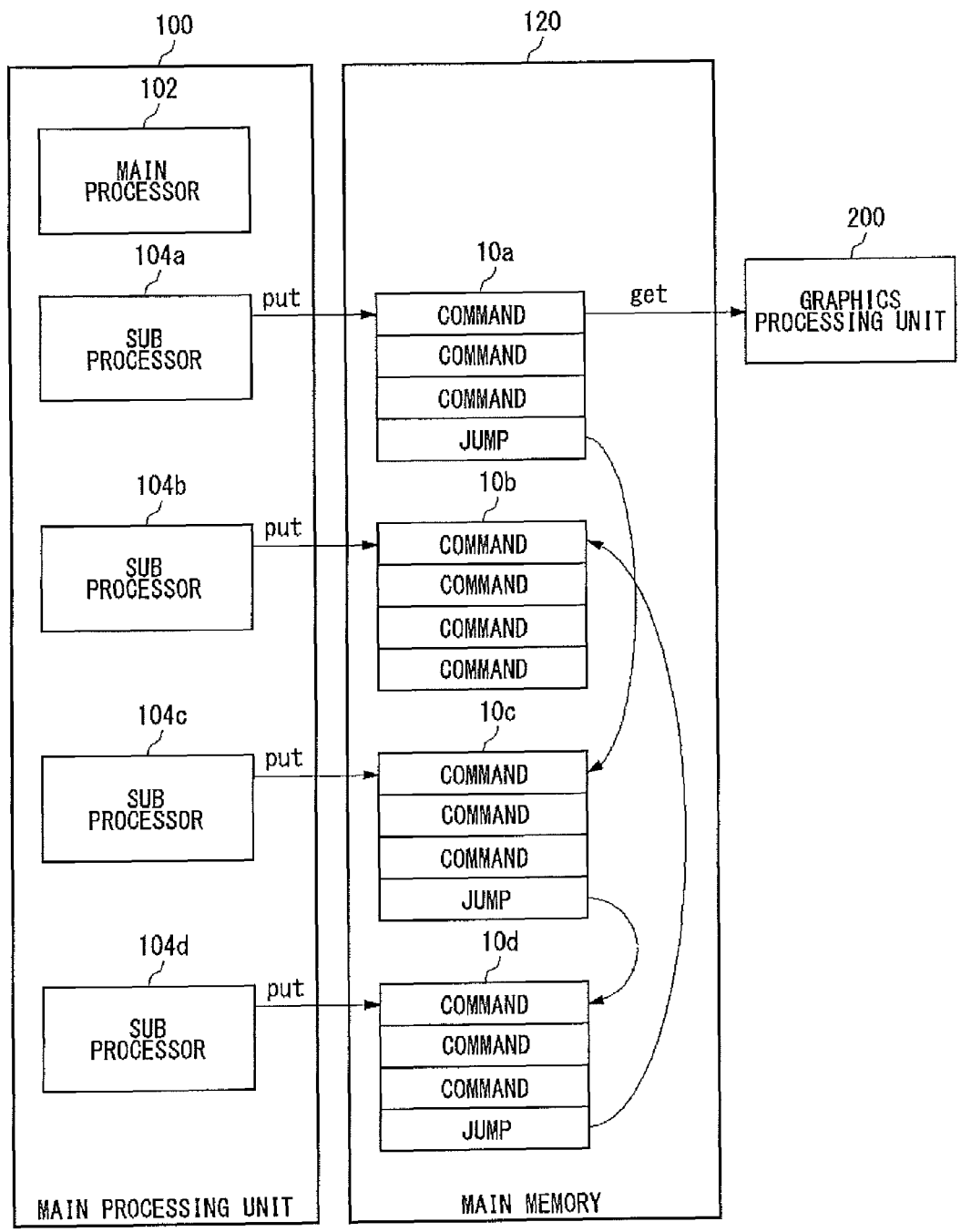
FIG. 11 illustrates a configuration of a graphics processing system according to a third embodiment of the present invention.

FIG. 11 illustrates a configuration of the graphics processing system according to a third embodiment of the present invention. The main processing unit 100 according to the third embodiment is a multiprocessor that includes the main processor 102 and plural sub processors 104a-104d. As in the case of the second embodiment, the main processor 102 is a general-purpose processor and the sub processors 104a-104d are processors that perform a process such as graphics processing other than common processes as described herein.

Plural sub processors 104a-104d are homogeneous processors that perform an identical instruction set. The main processing unit 100 is a heterogeneous multiprocessor, when viewed as a whole, because the main processor 102 and the sub processors 104a-104d are heterogeneous to each other. The main processing unit 100 can be a multicore processor in which the above processors are integrated into a single package.

The sub processors 104a-104d create their rendering command lists in the respective command buffers 10a-10d independently of each other. This enables the command lists to be generated in parallel. As described in the first embodiment, the multiple command lists can be linked by "jump" commands. Also, the command list created by a given sub processor can be reused by another sub processor. Since the sub processors 104a-104d are homogeneous processors that support an identical instruction set, the association of the command buffers each of which is generated by each sub processor and the reuse of the command buffers are enabled.

The GPU 200 reads the multiple command lists generated by the sub processors 104a-104d, from the main memory 120, and executes the command lists. As described in the second embodiment, the main processor 102 is not involved in the graphics processing, and mainly performs the common processing such as I/O processing.

The description of the invention given above is based upon embodiments. The embodiments are illustrative in nature and various variations in constituting elements and processes involved are possible. Those skilled in the art would readily appreciate that such variations are also within the scope of the present invention. Such variations will now be described.

In an embodiment of the present invention, a description has been given of the case where the rendering commands are generated in real time by the main processing unit 100 while the application program is being executed. However, before the application program is executed, the main processing unit 100 may generate the rendering commands offline and store the command list in a storage device in advance. At the time when the application program is executed, the main processing unit 100 acquires the rendering command list from the storage device and loads the command list into the main memory 120, so that the GPU 200 reads the commands from the rendering command list and then executes the commands. Especially in an application demanding high real-time performance such as a game, the command list relating to a process to be executed on a regular basis may be created offline in advance. This reduces the processing load on the main processing unit 100 and allows more computation resources to be assigned to the graphics processing to be executed in real time.

What is claimed is:

1. A graphics processing apparatus comprising:
a main processing unit, which generates at least one rendering command based on an application program;
a main memory, which holds geometry data, texture data, and a graphics command buffer retaining a rendering command sequence of at least one rendering command generated by the main processing unit, the geometry data, the texture data, and the graphics command buffer being memory-mapped to an I/O address space; and
a graphics processing unit, which reads the rendering command sequence retained in the graphics command buffer in the main memory, wherein the memory is outside the graphics processing unit, and executes a rendering process,
wherein the main processing unit comprises:
a main processor, which executes a common process; and
a sub processor, which executes an arithmetic operation relating to graphics and which generates and initializes the graphics command buffer,
wherein graphics processing tasks in the main processing unit are solely performed by the sub processor,
wherein management and reading and writing to and from the graphics command buffer is exclusively controlled by the sub processor, which further exclusively generates the rendering command based on the application program, stores in the graphics command buffer the rendering command that has been generated, generates geometry data and texture data necessary for executing the rendering command that has been generated, and stores the geometry data and the texture data in a respective memory-mapped section of the main memory on behalf of the main processing unit, and
wherein the sub processor communicates information on the rendering command generated with the graphics processing unit and synchronizes updates with the graphics processing unit by reading from or writing to a register of the graphics processing unit.

2. The graphics processing apparatus according to claim 1, wherein reading from and writing to the graphics command buffer is assisted by a read pointer and a write pointer, respectively, the read pointer pointing to a position in the graphics command buffer from which the rendering command is read by the graphics processing unit next time, the write pointer pointing to a position in the graphics command buffer at which the sub processor completed writing the rendering command last time.

3. The graphics processing apparatus according to claim 1, wherein the sub processor controls synchronization with the graphics processing unit without intervention by the main processor.

4. The graphics processing apparatus according to claim 1, wherein the graphics processing unit controls synchronization with the sub processor by interrupting the sub processor, without intervention by the main processor.

5. The graphics processing apparatus according to claim 1, wherein the sub processor and the graphics processing unit control synchronization with each other by reading or writing data retained in the main memory outside the graphics command buffer, without intervention of the main processor.

6. A graphics processing apparatus comprising:
a main processing unit, which generates at least one rendering command based on an application program;
a main memory, which holds geometry data, texture data, and a plurality of graphics command buffers retaining a rendering command sequence of at least one rendering command generated by the main processing unit, the geometry data, the texture data, and the plurality of graphics command buffers being memory-mapped to an I/O address space; and
a graphics processing unit, which reads the rendering command sequence retained in the plurality of graphics command buffers in the main memory, wherein the main memory is outside the graphics processing unit, and executes a rendering process,
wherein the main processing unit comprises:
a main processor, which executes a common process; and
a plurality of sub processors, which operate independently of each other, wherein each of the plurality of sub processors generates and initializes a respective graphics command buffer,
wherein graphics processing tasks in the main processing unit are solely performed by the plurality of sub processors,
wherein management and reading and writing to and from a respective graphics command buffer among the plurality of graphics command buffers is exclusively controlled by a respective sub processor among the plurality of sub processors, independently of each of the other sub processors, the respective sub processor further exclusively generating the rendering command sequence independently, retaining the generated rendering command sequence in the respective graphics command buffer, and generating jump instructions to link the individual respective graphics command buffers, a jump instruction having a jump destination address set to a head address of the rendering command sequence corresponding to another graphics command buffer on behalf of the main processing unit.

7. The graphics processing apparatus according to claim 6, wherein the sub processor, which generates the rendering command sequence also generates data necessary for the execution of the rendering command that has been generated and retains the data in the main memory outside the graphics command buffer.

8. The graphics processing apparatus according to claim 6, wherein another sub processor which is different from one sub processor generating the rendering command sequence generates data necessary for the execution of the rendering command that has been generated, and retains the data in the main memory outside the graphics command buffer.

* * * * *